Patented Oct. 24, 1922.

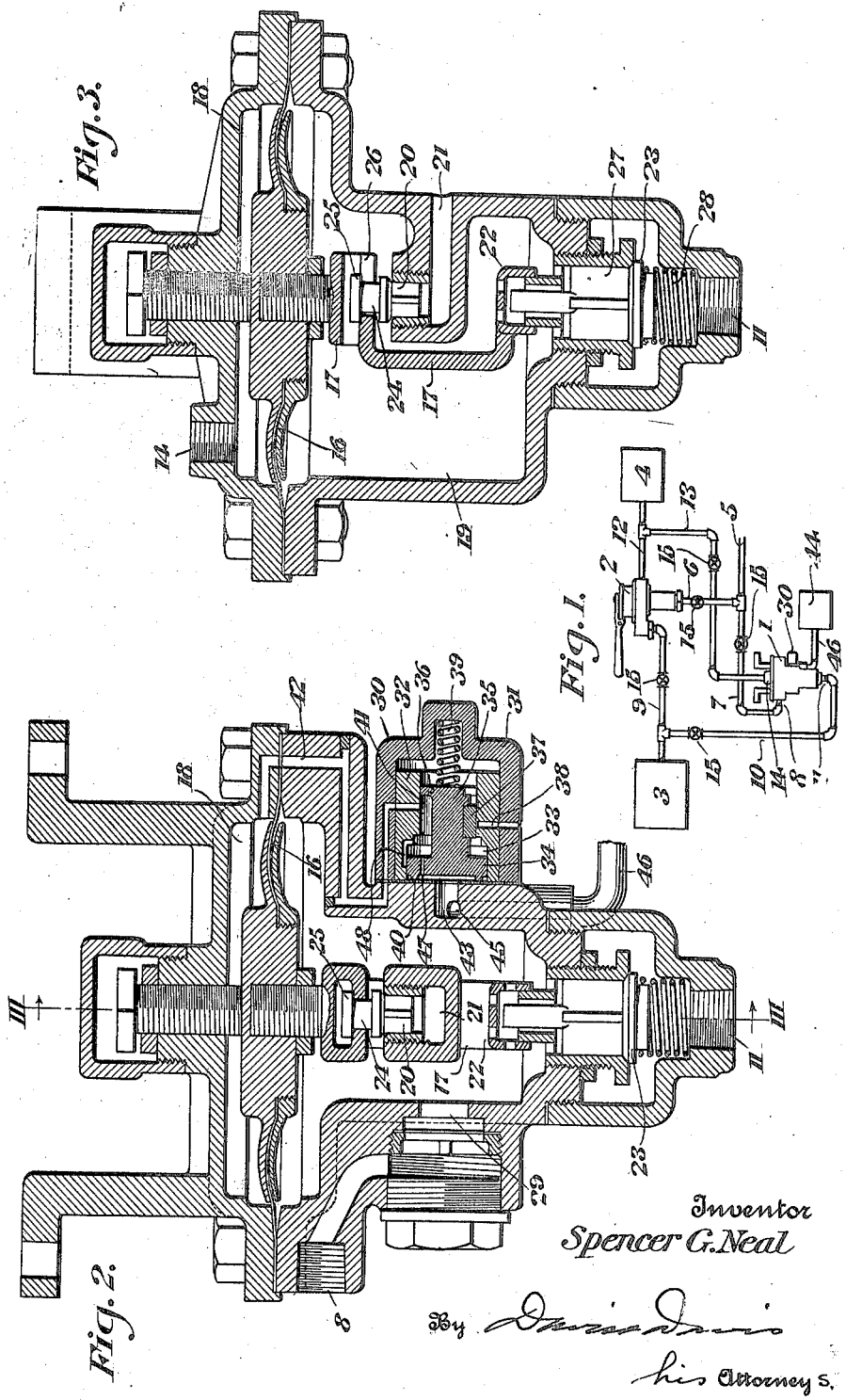

1,433,405

UNITED STATES PATENT OFFICE.

SPENCER G. NEAL, OF NEW YORK, N. Y., ASSIGNOR TO AUTOMATIC STRAIGHT AIR BRAKE COMPANY, OF WILMINGTON, DELAWARE, A CORPORATION OF DELAWARE.

COMPENSATING VALVE.

Application filed January 3, 1921. Serial No. 434,737.

*To all whom it may concern:*

Be it known that I, SPENCER G. NEAL, a citizen of the United States, and residing in the borough of Manhattan, city, county, and State of New York, have invented certain new and useful Improvements in Compensating Valves (Case No. 38), of which the following is a specification.

This invention relates to improvements in that type of compensating valves shown in Patent No. 1,089,579, dated March 10, 1914, and also shown in Patent No. 1,314,975, dated September 2, 1919. These compensating valves are operated by equalizing reservoir pressure and brake pipe pressure and control a connection between the main reservoir and the brake pipe and between the brake pipe and atmosphere, and maintain a uniform brake pipe pressure.

The object of this invention is to provide means to insure a rapid reduction in equalizing reservoir pressure when the engineer's brake valve is placed in emergency position for the purpose of securing an emergency application of the brakes. When the engineer's brake valve is placed in emergency position, there is a very rapid reduction in brake pipe pressure and a slower reduction in equalizing reservoir pressure, and it is the object of this invention to provide means for quickly reducing the equalizing reservoir pressure to zero, or approximately so, in order to insure the rapid operation of the compensator in emergency applications of the brakes and to prevent the main reservoir pressure exhausting through the compensator. Another object of the invention is to provide means whereby the equalizing reservoir venting will not operate during all slow service reduction in brake pipe pressure, but will only operate on a sudden reduction in brake pipe pressure designed to secure an emergency application of the brakes.

In the drawing:

Fig. 1 is a diagrammatic view showing the compensator and its connections to the engineer's valve and the main reservoir and equalizing reservoir;

Fig. 2 a vertical sectional view of the compensating valve; and

Fig. 3 a similar view taken on the line III—III of Fig. 2.

Referring to the various parts by numerals, 1 designates the compensating valve; 2 the engineer's brake valve; 3 the main reservoir; and 4 the equalizing reservoir. The brake pipe 5 is connected to the engineer's brake valve by pipe 6, in the usual manner, and is connected to the compensator by pipe 7, the latter pipe being connected to the compensator at 8. The main reservoir is connected to the engineer's valve by pipe 9 and to the compensator by pipe 10, said pipe being connected to the bottom of the compensator at 11. The equalizing reservoir is connected to the engineer's valve by pipe 12 and to the compensator by pipe 13, said pipe being connected to the compensator at 14. All of these pipes are provided with the usual cut-off valves 15. The engineer's valve may be modified, as described in Patent No. 1,089,579 and also in Patent No. 1,314,975, to render the equalizing discharge piston inoperative, so that the brake pipe exhaust will be secured through the compensating valve.

The main operating parts of the compensating valve are constructed substantially as shown in Patent No. 1,314,975, and comprise a casing in which is arranged a diaphragm 16 from which depends the valve-operating yoke 17. The diaphragm 16 divides the interior of the casing into an upper equalizing chamber 18 which is in communication with the equalizing reservoir 4 through pipe 13; and a lower brake pipe chamber 19 which is at all times in communication with the brake pipe 5 through the branch pipe 7. A release valve 20 is connected to the yoke 17 and is provided with a depending winged portion which travels in a valve cage formed at the inner end of an exhaust passage 21. The yoke 17 at its lower end is provided with a horizontally extending arm 22 which is in alignment with the stem of an upwardly seating supply valve 23. The arm 22 is formed with a depending annular guide flange which engages a rigid guide carried by the valve casing. It is obvious that when diaphragm 16 is depressed by a superior pressure in the equalizing reservoir chamber 18, the exhaust valve 20 will be closed and the supply valve 23 will be opened. Because of the lost-motion connection between the yoke 17 and valves 20 and 23 there is a point in the movement of the diaphragm 16 at which both of said valves will be closed. This also insures the closing of one valve before the other valve is opened by the movement of the diaphragm.

The release valve 20 is formed with an upwardly extending neck 24 terminating in a head 25. The yoke 17 is provided with a forked portion 26 which receives the neck 24 and connects the release valve to the yoke.

The supply valve 23 is guided by a winged portion 27 and is held yieldingly to its seat by a spring 28 which normally forces the valve upwardly. The space in the casing below the supply valve 23 is in communication with the main reservoir through pipe 10, so that whenever said valve is opened through the operation of the diaphragm 16, main reservoir air will flow into the chamber 19 and thence to the brake pipe through opening 29.

When the engineer's brake valve is placed in emergency position, brake pipe pressure is exhausted through the brake valve more rapidly than the equalizing reservoir pressure is reduced. The result of this is that the pressure in the equalizing reservoir chamber 18 of the compensating valve will, during a certain period, exceed the pressure in the brake pipe chamber 19 of the compensating valve and the diaphragm 16 will be depressed during that period of time and the supply valve 23 will be held open. During this period the main reservoir air will pass through the compensating valve to the brake pipe and then to atmosphere through the engineer's brake valve, until the pressure in the equalizing reservoir has been exhausted, at which time the supply valve 23 will be closed.

To immediately exhaust the equalizing reservoir pressure upon a sudden reduction of brake pipe pressure. I provide the equalizing reservoir vent valve 30. This vent valve consists of a casing 31 secured to the compensating valve casing and provided with an interior bushing 32. The bore of this bushing is enlarged at its inner end to form the piston chamber 33. In this piston chamber is mounted a piston 34 having an outwardly extending stem 35 which carries at its outer end a guide head 36 which is designed to reciprocate in the bore of the bushing 32 near the outer end thereof. Connected to the piston stem is a small slide valve 37, the interior of the bushing 32 forming a seat for said valve. A spring 39 normally forces the piston inwardly and maintains the valve 37 in position to close an exhaust port 38. The piston 34 is shown as stopped against a gasket at the inner end of the piston chamber and when in this position leakage around the piston is prevented by an annular rib 40. The equalizing reservoir chamber 18 is connected to the chamber 41 between the piston 34 and the guide head 36 by means of a passage 42, so that equalizing reservoir pressure will be registered within the vent valve casing.

The small chamber 43 is formed at the inner side of the piston 34 and this small chamber is connected to a tank 44 by means of a passage 45 and a pipe 46. A small leak port 47 is formed through the piston 34 to permit equalizing reservoir pressure to slowly leak into the tank 44. A release groove 48 is formed in the piston chamber 33 to permit a free release of the pressure trapped in tank 44 when the piston 34 is moved inwardly to release position.

It is manifest that equalizing reservoir pressure from chamber 18 will pass through passage 42 into chamber 41 and then through leak port 47 into the tank 44. It is also manifest that in all slow reductions of equalizing reservoir pressure for the purpose of securing slow or service applications of the brakes the trapped pressure in 44 will slowly pass back to chamber 41 through the port 47 and there will be no movement of the piston 34, and the equalizing reservoir vent valve will remain inactive during service applications of the brakes. When, however, there is a sudden reduction of equalizing reservoir pressure for the purpose of securing an emergency application of the brakes, the reduction of pressure in chamber 18, and consequently in chamber 41, will be more rapid than the reduction of pressure in chamber 43. The trapped pressure in tank 44 will move the piston 34 outwardly and uncover the equalizing reservoir exhaust port 38, thereby permitting a complete release of the equalizing reservoir pressure from chamber 18. This will prevent a downward movement of the diaphragm 16 and the opening of supply valve 23.

When the piston 34 has been moved inwardly to release position, the release groove 48 will be uncovered and the air in tank 44 will have an additional path of escape around the piston. When the pressure in tank 44 has been reduced to zero, or approximately so, the spring 39 will move the piston and the slide valve 37 inwardly to close port 38.

What I claim is:

1. A compensating valve comprising a casing, a diaphragm therein and forming an equalizing reservoir chamber and a brake pipe chamber, a supply valve, a release valve, both of said valves being adapted to be operated by said diaphragm in response to variations of pressure in the equalizing reservoir chamber, the supply valve being opened when the equalizing reservoir chamber pressure exceeds the pressure in the brake pipe chamber and the release valve being opened when the equalizing reservoir pressure is below the brake pipe pressure, a vent valve for the equalizing reservoir chamber, and means whereby said valve will remain inactive during all slow changes of pressure in the equalizing reservoir chamber but will respond to a sudden reduction of pressure in the equalizing reservoir chamber to open said vent valve and exhaust the air from the equalizing chamber to atmosphere.

2. A compensating valve comprising a casing, a diaphragm therein and forming an equalizing reservoir chamber and a brake pipe chamber, a supply valve, a release valve, both of said valves being adapted to be operated by said diaphragm in response to variations of pressure in the equalizing reservoir chamber, the supply valve being opened when the equalizing reservoir chamber pressure exceeds the pressure in the brake pipe chamber and the release valve being opened when the equalizing reservoir pressure is below the brake pipe pressure, a vent valve for the equalizing reservoir chamber comprising a piston subject on one side to the pressure in the equalizing reservoir chamber and on the other side to a trapped pressure, means for slowly equalizing the pressures on opposite sides of said piston whereby a sudden reduction of pressure in the equalizing reservoir chamber will permit the trapped pressure to move said piston, and an exhaust valve adapted to be moved by said piston to open an exhaust port from the equalizing reservoir chamber upon a sudden reduction of pressure in the equalizing reservoir chamber.

3. A compensating valve comprising a casing, a diaphragm therein and forming an equalizing reservoir chamber and a brake pipe chamber, a supply valve, a release valve, both of said valves being adapted to be operated by said diaphragm in response to variations of pressure in the equalizing reservoir chamber, the supply valve being opened when the equalizing reservoir chamber pressure exceeds the pressure in the brake pipe chamber and the release valve being opened when the equalizing reservoir pressure is below the brake pipe pressure, a vent valve for the equalizing reservoir chamber comprising a piston subject on one side to the pressure in the equalizing reservoir chamber and on the other side to a trapped pressure, means for slowly equalizing the pressures on opposite sides of said piston whereby a sudden reduction of pressure in the equalizing reservoir chamber will permit the trapped pressure to move said piston, an exhaust valve adapted to be moved by said piston to open an exhaust port from the equalizing reservoir chamber upon a sudden reduction of pressure in the equalizing reservoir chamber, and a spring normally holding the piston in position to close the exhaust port from the equalizing reservoir chamber when the pressures on opposite sides of the piston are equalized.

4. A compensating valve comprising a casing, a diaphragm therein and forming an equalizing reservoir chamber and a brake pipe chamber, a supply valve, a release valve, both of said valves being adapted to be operated by said diaphragm in response to variations of pressure in the equalizing reservoir chamber, the supply valve being opened when the equalizing reservoir chamber pressure exceeds the pressure in the brake pipe chamber and the release valve being opened when the equalizing reservoir pressure is below the brake pipe pressure, a vent valve for the equalizing reservoir chamber comprising a piston subject on one side to the pressure in the equalizing reservoir chamber and on the other side to a trapped pressure, means for slowly equalizing the pressures on opposite sides of said piston whereby a sudden reduction of pressure in the equalizing reservoir chamber will permit the trapped pressure to move said piston, an exhaust valve adapted to be moved by said piston to open an exhaust port from the equalizing reservoir chamber upon a sudden reduction of pressure in the equalizing reservoir chamber, and a release port around the piston arranged to be uncovered when the piston is moved to release position to open the exhaust port from the equalizing reservoir chamber.

5. A compensating valve comprising a casing, a diaphragm therein and forming an equalizing reservoir chamber and a brake pipe chamber, a supply valve, a release valve, both of said valves being adapted to be operated by said diaphragm in response to variations of pressure in the equalizing reservoir chamber, the supply valve being opened when the equalizing reservoir chamber pressure exceeds the pressure in the brake pipe chamber and the release valve being opened when the equalizing reservoir pressure is below the brake pipe pressure, a vent valve for the equalizing reservoir chamber comprising a casing, a piston therein dividing said casing into two chambers, a leak port formed through the piston and connecting said two chambers, a passage connecting the chamber at one side of said piston through the equalizing reservoir chamber, a tank connected to the chamber on the other side of said piston, an exhaust valve adapted to be moved by said piston, and a spring operating on said piston and holding said exhaust valve closed when the pressures on opposite sides of said piston are equalized, whereby upon slow reductions of the pressure in the equalizing reservoir chamber the piston will remain inactive and the exhaust valve closed, the piston being moved by the trapped pressure when the reduction of pressure in the equalizing reservoir chamber is sudden.

6. The combination of a compensating valve adapted to be operated by opposed brake pipe and equalizing reservoir pressures, and a vent valve adapted to operate upon a sudden reduction in equalizing reservoir pressure to vent the equalizing reservoir to atmosphere.

7. The combination of a compensating valve adapted to be operated by opposed brake pipe and equalizing reservoir pressures, a vent valve adapted to operate upon a sudden reduction in equalizing reservoir pressure to vent the equalizing reservoir to atmosphere, and means to permit said vent valve to remain inactive during all slow reductions of equalizing reservoir pressure.

8. The combination of a compensating valve adapted to be operated by opposed brake pipe and equalizing reservoir pressures, and a vent valve adapted to operate upon a sudden reduction in one of said pressures to vent the equalizing reservoir to atmosphere.

In testimony whereof I hereunto affix my signature.

SPENCER G. NEAL.